Figures 1, 2:
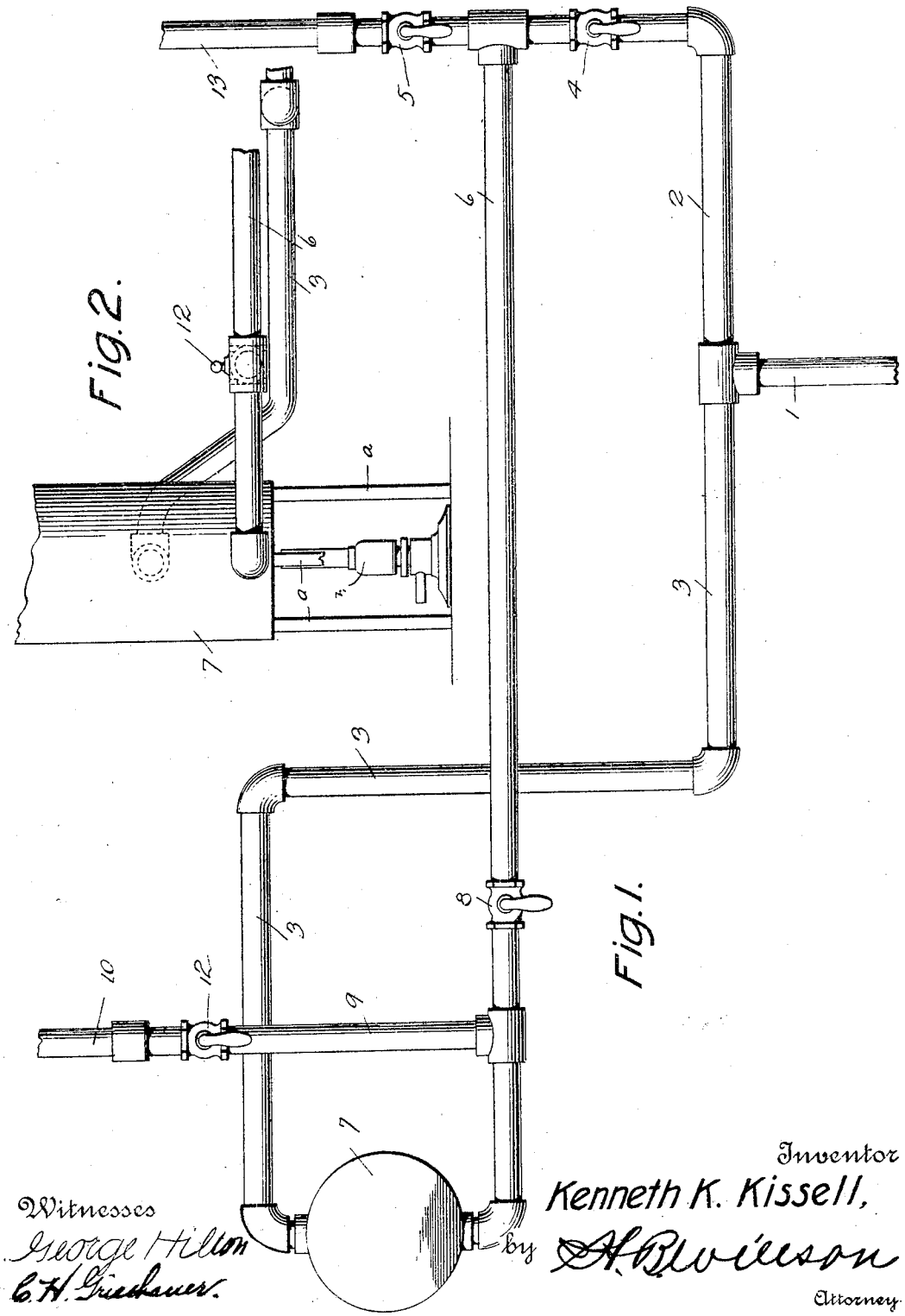

No. 795,138. PATENTED JULY 18, 1905.
K. K. KISSELL.
WATER DISTRIBUTING SYSTEM.
APPLICATION FILED FEB. 2, 1905.

Witnesses
George Hilton
C. H. Grechauer.

Inventor
Kenneth K. Kissell,
by H. B. Willson
Attorney

No. 795,138.

Patented July 18, 1905.

UNITED STATES PATENT OFFICE.

KENNETH K. KISSELL, OF BROWNSVILLE, PENNSYLVANIA.

WATER-DISTRIBUTING SYSTEM.

SPECIFICATION forming part of Letters Patent No. 795,138, dated July 18, 1905.

Application filed February 2, 1905. Serial No. 243,872.

*To all whom it may concern:*

Be it known that I, KENNETH K. KISSELL, a citizen of the United States, residing at Brownsville, in the county of Fayette and State of Pennsylvania, have invented certain new and useful Improvements in Water-Distributing Systems; and I do declare the following to be a full, clear, and exact description of the invention, such as will enable others skilled in the art to which it appertains to make and use the same.

This invention relates to improvements in antifreezing devices for water-pipes.

The object of the invention is to provide a simple arrangement of pipes and valves in connection with a suitable water-heating apparatus whereby the water in pipe systems will be prevented from freezing.

With the above and other objects in view the invention consists of certain novel features of construction, combination, and arrangement of parts, as will be hereinafter described and claimed.

Figure 1 is a diagrammatic view of an arrangement of pipes and valves constituting my invention, and Fig. 2 is a detail side elevation of the tank and heater.

Referring to the drawings more particularly, 1 denotes the supply-pipe from a street-main. To the pipe 1 adjacent to its entrance into the building is connected branch pipes 2 and 3. The branch pipe 2 is connected to and forms a part of the system of cold-water pipes of the building. In the pipe 2 is arranged cut-off valves 4 and 5, between which is connected a pipe 6, which runs to a hot-water-supply tank 7. As shown, the tank 7 is supported upon legs *a*, and a heater *b* is placed under the bottom of the tank for heating the water therein. It will be understood that any suitable heater may be employed, or, if desired, the tank may be connected to the usual water-back of a kitchen-range. In the pipe 6 is arranged a valve 8, between which and the hot-water-supply tank 7 is connected a pipe 9, which is connected to and forms a part of the system of hot-water pipes 10 of the building. In the pipe 9 is arranged a cut-off valve 12.

The branch pipe 3 runs from the supply-pipe 1 and connects with the hot-water-supply tank 7, whereby the latter is continually supplied with water from the street-main. The hot-water tank 7 is provided with a suitable heating arrangement, (not shown,) whereby the water in the same may be kept hot. Under normal conditions when there is no danger of the water freezing in the pipes of the system the valves 4, 5, and 12 are kept open while the valve 8 is closed, thus permitting cold water from the supply-pipe 1 to flow directly through the branch pipe 2 to the cold-water pipes 13 of the system. Cold water will also flow from the supply-pipe 1 through the branch pipe 3 to the hot-water tank 7, from whence hot water is supplied through the pipe 9 to the hot-water pipes 10 of the system. When there is danger of the water in the pipes becoming frozen, which usually occurs at night, while no water is being used, the valve 4 will be closed and the valve 8 open, the valves 5 and 12 being also left open. By this arrangement all the water from the supply-pipe 1 will be caused to pass through the branch pipe 3 and the hot-water tank 7 before entering either the cold-water pipes 13 or hot-water pipes 10 of the system, thus keeping said water at such a temperature as to prevent the same from freezing. It may be sufficient, except in intensely cold weather, to simply open the valve 8 and permit hot water from the tank 7 to enter the pipe 2 and to mingle with the cold water therein from the pipe 1, thereby slightly warming the same before it passes into the cold-water system of pipes 13.

By arranging the pipes as herein shown and described a simple and efficient means will be provided for preventing the freezing of the water in either the hot or cold water systems of pipe in a building.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a water-distributing system, the combination with an arrangement of branched pipes connecting a cold-water supply directly with a system of cold-water pipes and with a hot-water tank, a connection between said hot-water tank and the cold-water branch pipe, a pipe leading from said connection to a system of hot-water pipes, and suitably-arranged cut-off valves disposed in said pipes to control the flow of water through the same, substantially as described.

2. In a water-distributing system, the combination with the branch pipes 2 and 3 connected to a water-supply pipe, the pipe 2 being connected directly to a cold-water system of pipes, a hot-water tank directly connected to the branch pipe 3, cut-off valves arranged in the branch pipe 2, a valved pipe connecting said branch pipe 2 between said valves with said hot-water tank, and a valved pipe 9 connecting the valved pipe 6 between the valve therein and the hot-water tank, with a system of hot-water pipes, substantially as described.

3. In a water-distributing system, the combination with the branch pipes 2 and 3 connected to a water-supply pipe, the pipe 2 being connected directly to a cold-water system of pipes, a hot-water tank directly connected to the branch pipe 3, cut-off valves arranged in the branch pipe 2, a valved pipe connecting said branch pipe 2 between said valves with said hot-water tank and a valved pipe 9 connecting the valved pipe 6 between the valve therein and the hot-water tank, with a system of hot-water pipes, substantially as described.

In testimony whereof I have hereunto set my hand in presence of two subscribing witnesses.

KENNETH K. KISSELL.

Witnesses:
MARY WHETZEL,
HARRY A. COTTON.